Feb. 11, 1969  HOSEI SATO  3,426,671
AUTOMATIC TOASTER
Filed Dec. 14, 1966  Sheet 5 of 16

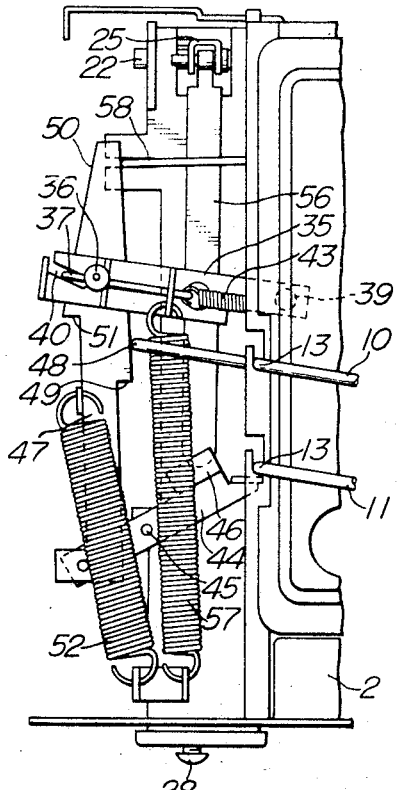
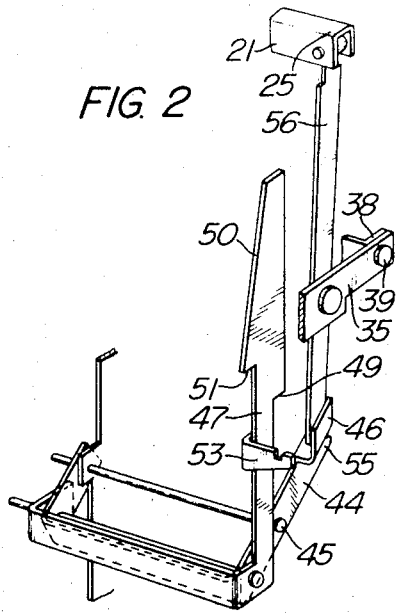
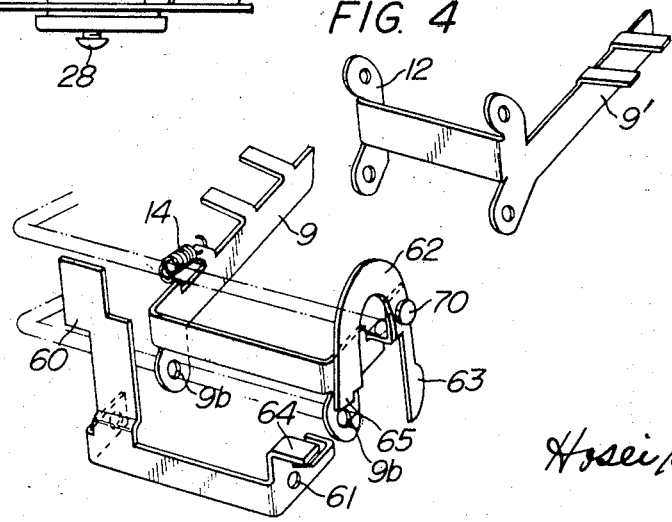

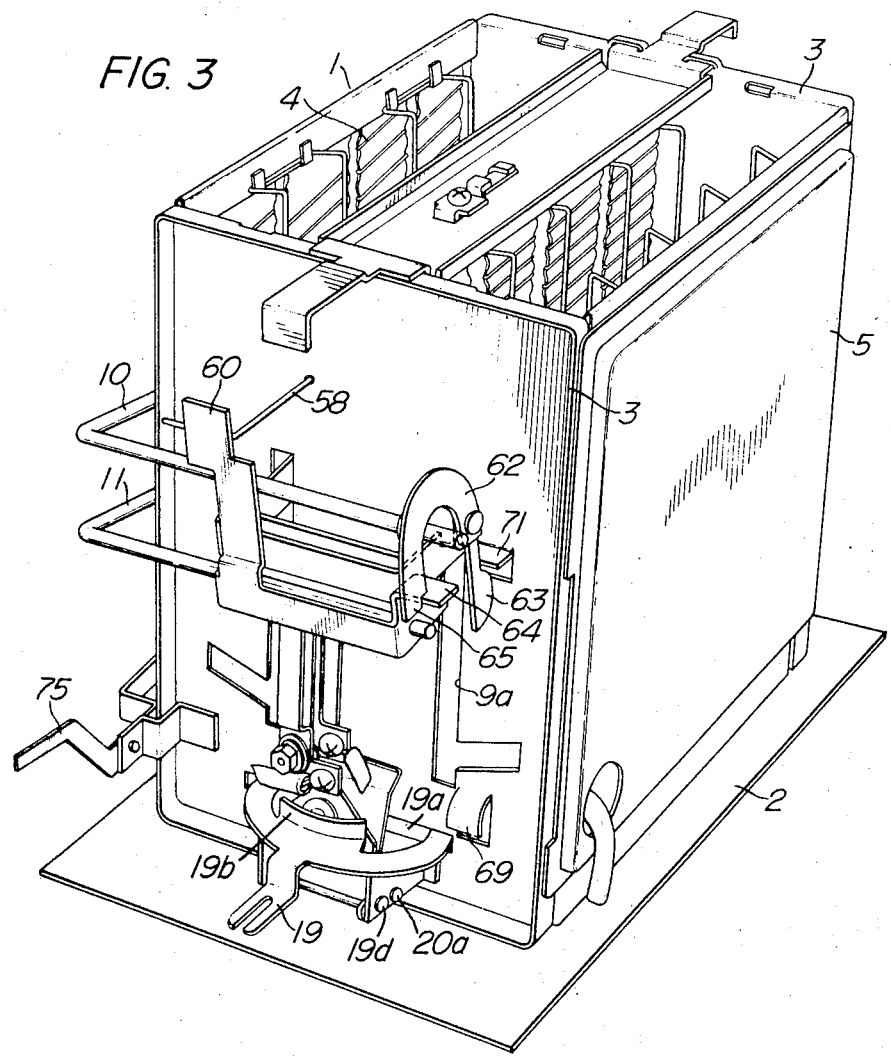

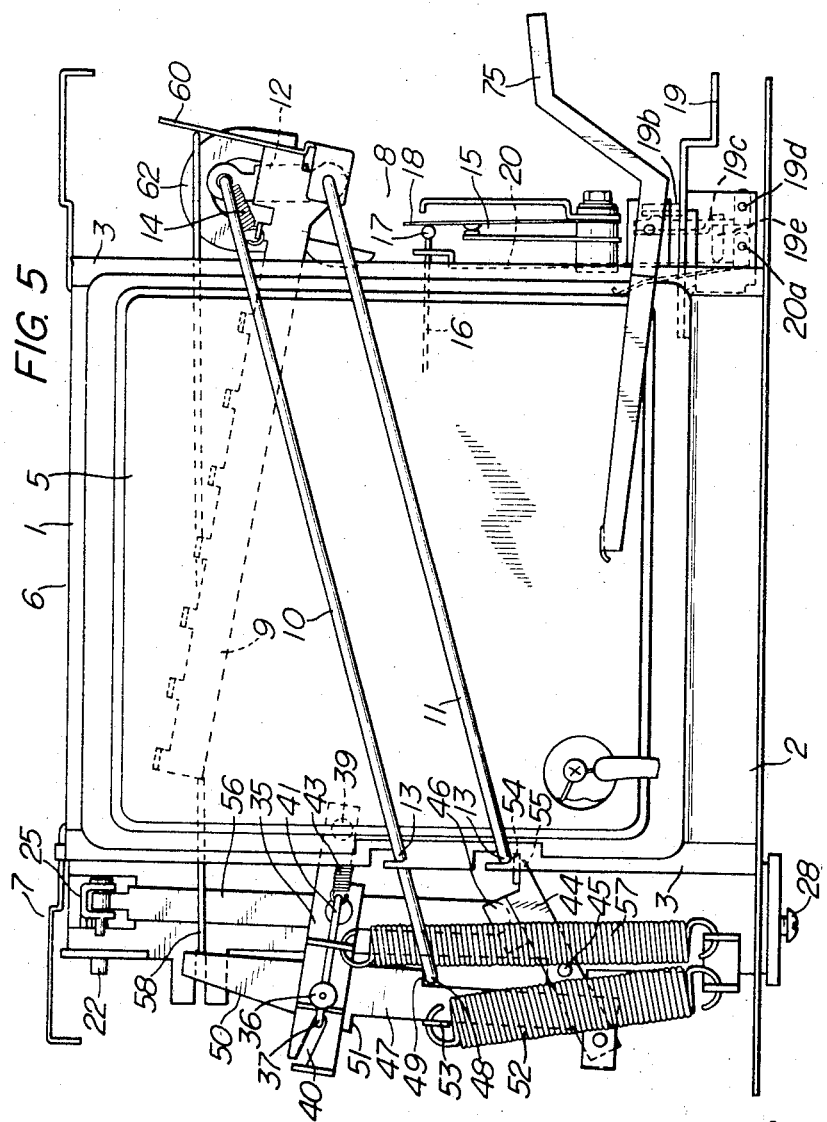

Hosei Sato
INVENTOR

BY Wendroth, Lind & Ponack
ATTORNEYS

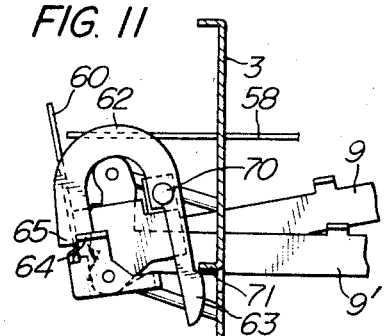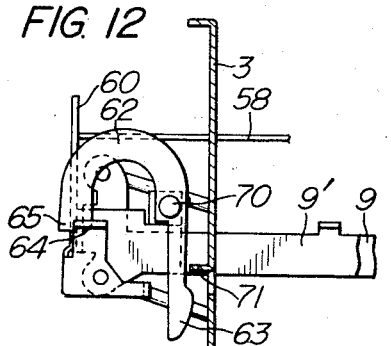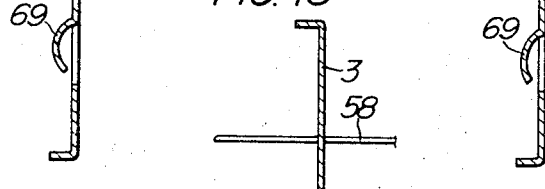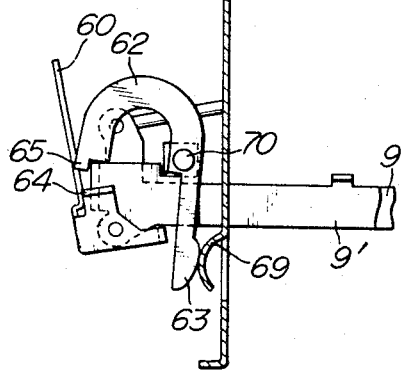

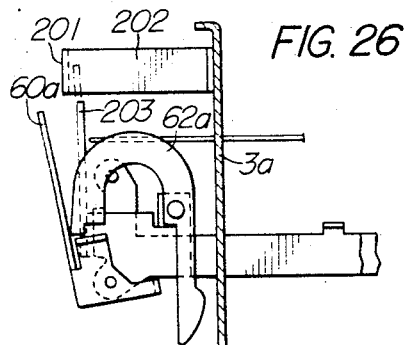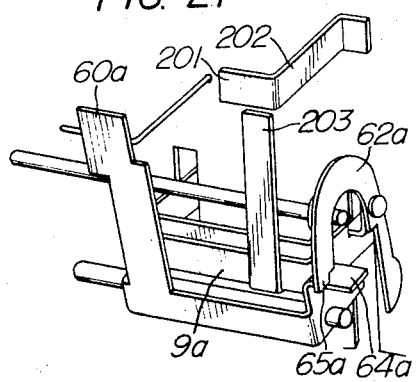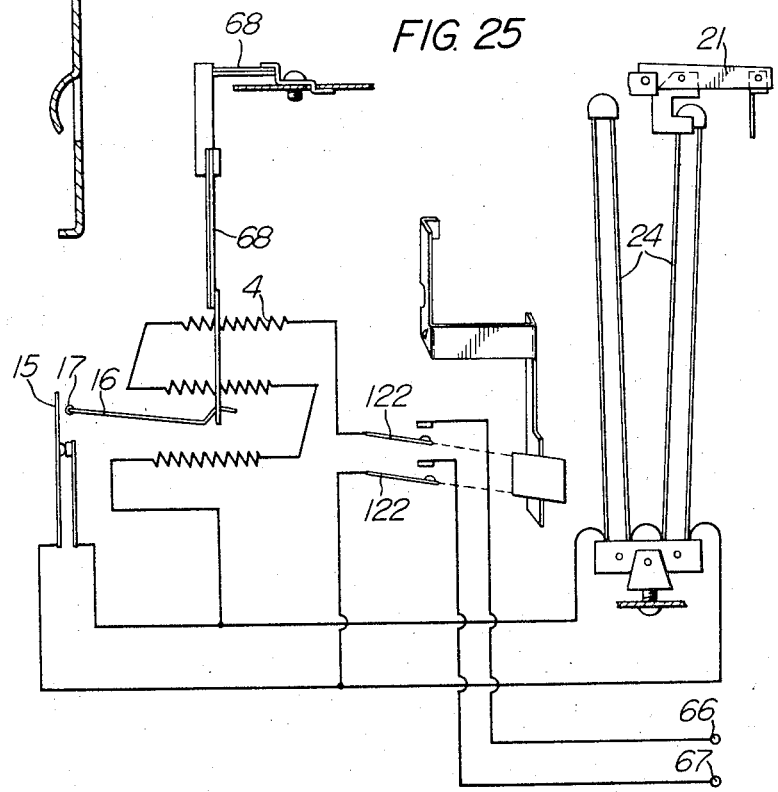

United States Patent Office 3,426,671
Patented Feb. 11, 1969

3,426,671
AUTOMATIC TOASTER
Hosei Sato, Nishinomiya-shi, Japan, assignor to Matsushita Electric Industrial Co., Ltd., Osaka, Japan, a corporation of Japan
Filed Dec. 14, 1966, Ser. No. 601,690
Claims priority, application Japan, Dec. 20, 1965, 40/79,057; July 29, 1966, 41/50,905
U.S. Cl. 99—329                                   9 Claims
Int. Cl. A47j 37/08

ABSTRACT OF THE DISCLOSURE

An automatic toaster having the usual toaster heating elements, a bread support means movable from a bread removing position to a bread toasting position and power circuit switching means for closing a power supply circuit when said bread support means moves down to the toasting position. To raise the bread support means at the end of the toasting cycle, an expansible and contractible resistance wire and an energy accumulating means coupled to said wire for accumulating energy as said wire stretches when a current is passed therethrough are provided for accumulating energy when said wire contracts as it cools after the current is cut off from said wire. Lifting means for lifting said bread support means to the bread removing position are driven by the energy accumulated in said energy accumulating means after a predetermined amount of energy has been accumulated. Control means are provided for said power circuit for supplying current to said resistance wire after a predetermined toasting condition has been reached and thereafter opening said power circuit switching means after said resistance wire has expanded a predetermined amount. The wire then cools, energy is accumulated, and then when the predetermined amount has been reached, the bread support means is lifted to the bread removing position.

The present invention relates to a toaster and more particularly to a so-called fully automatic toaster of the type in which the bread support is automatically moved to the toasting position when a slice of bread is placed thereon, and is then automatically returned to the bread removing position upon completion of the toasting of the bread. More particularly, this invention relates to an improvement in the mechanism for shifting the bread support from the toasting position to the bread removing position and vice versa.

Heretofore, there has been proposed a system in which the bread support is caused to move from the toasting position to the bread removing position or vice versa by making use of the stretching or contraction of a resistance wire as it conducts a current or after cessation of current flow there-through. The system of the type described, however, has the drawback that the resistance wire stretches or contracts at a low rate and therefore the movement of the bread-support is slow.

In order to accelerate the movement of the bread support, systems have been proposed in which an electromagnet or a motor is employed, but these systems are not satisfactory in that their costs are high and also in that an unpleasant sound is generated during their operation.

The present invention has been made in an attempt to eliminate the aforementioned drawbacks possessed by the conventional toasters, and to ensure a positive and quick operation and an improved thermal efficiency by means of an effective use of an extensible and contractible resistance wire.

An object of the present invention, therefore, is to provide a toaster of the type in which the bread support is automatically and quickly moved from the bread removing position to the toasting position when a slice of bread is placed thereon and is quickly and automatically moved from the toasting position to the bread removing position upon completion of the toasting by taking advantage of energy which has been accumulated in the toaster.

Another object of the invention is to provide a mechanism for accumulating the amounts an extensible and contractible resistance wire moves as a result of both the stretching and contraction thereof as energy for producing the return movement of the bread support, and thus to provide a toaster in which energy is efficiently utilized and which is simple in its construction and smooth in its operation.

Other objects and advantages of the invention will become apparent from the following description and the accompanying drawings, in which:

FIG. 2 is a perspective view of the latch lever and associated parts shown in FIG. 1;

FIG. 3 is a perspective view of the toaster taken from the other end;

FIG. 4 is an exploded perspective view of the latch and parts associated therewith as shown in FIG. 3;

FIG. 5 is a side elevation view of the toaster, removing the main switch therefrom, shown in FIG. 1 in an unloaded position;

FIGS. 6 to 8 are side elevation views of the latch lever and associated parts shown in FIG. 1, and showing the parts in the positions occupied during successive steps of the operation;

FIGS. 11 to 15 are side elevation views illustrating the successive steps in the operation of the latch and associated parts of the toaster shown in FIG. 1;

FIG. 25 is a schematic circuit diagram of the toaster shown in FIG. 17; and

FIGS. 26 and 27 are a side view and a perspective view, respectively, of another embodiment of the latch and parts associated therewith.

The present invention will now be described in detail in connection with the embodiments shown in the accompanying drawings in which the same reference numerals indicate similar parts.

Figure 1:
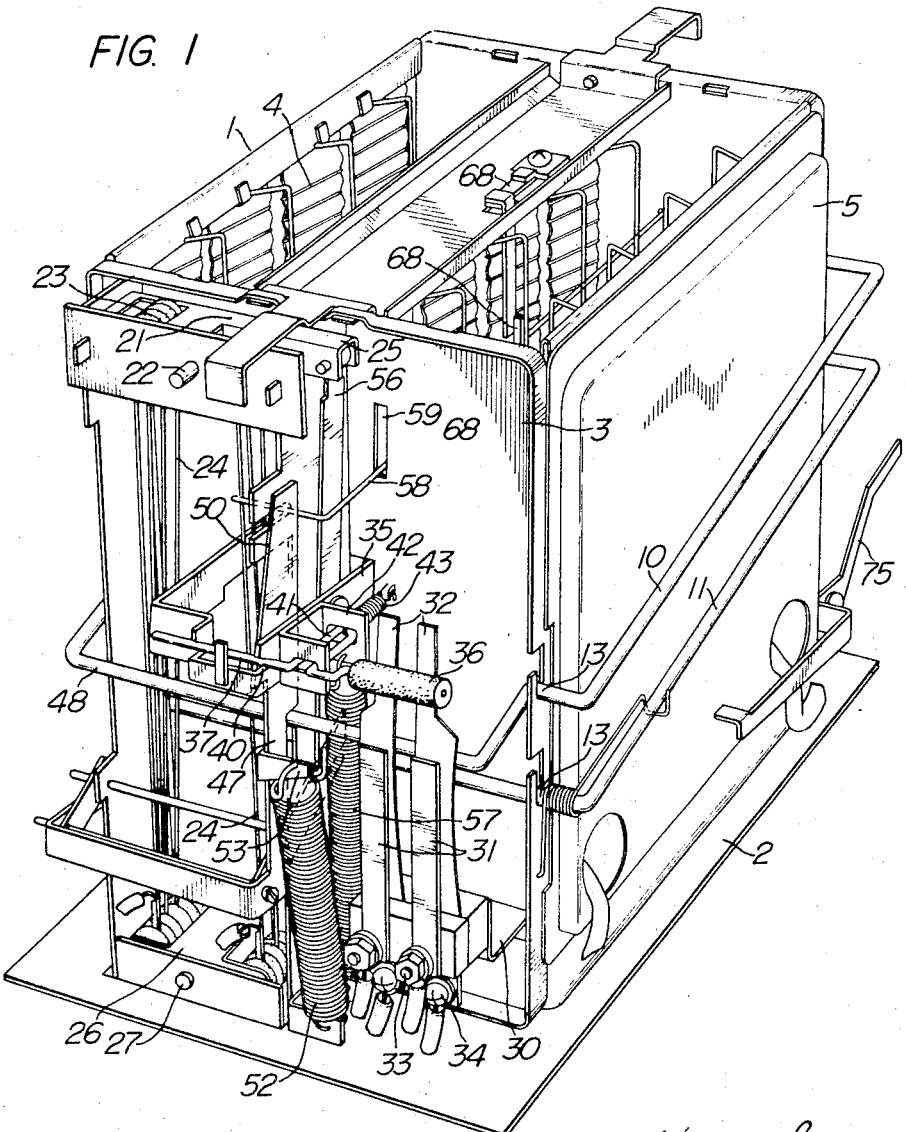
FIG. 1 is a perspective view of an embodiment of the toaster according to the present invention as taken from one end thereof and with the outer casing removed.

Referring first to the embodiment shown in FIGS. 1 through 16, a framework 1 comprises opposite end plates 3 mounted on a base 2 in an upright position, bread toasting heaters 4 extending between the respective end plates 3 and opposed side reflector plates 5. There is thus defined within the sheel or casing (not shown) a bread toasting compartment 6, a chamber 7 for an extensible and contractible resistance wire and a chamber 8 for an auxiliary switch. Within the bread toasting compartment 6 is positioned a bread support 9 which has one end thereof extending into the auxiliary switch chamber 8 through a slot 9a in one end plate 3 (see FIG. 3). A pair of parallel levers 10 and 11 each have one end thereof pivotally mounted in a connecting plate 12, and the other ends are pivotally supported on the side plate 3 at fulcrums 13, so that said levers 10 and 11 move in parallelogrammic movement. Connecting plate 12 has one end of a further bread support 9' thereon, and the aforementioned bread support 9 is pivotally mounted relative to plate 12 by being pivotally mounted on the laterally extending portion of lever 10 by holes 9b. A spring 14 is connected between said crank lever 10 and said bread support 9 urging said bread support 9 to pivot so that it is inclined upwardly when it is not loaded with a slice of bread.

A closed-type auxiliary switch 15 is positioned in the auxiliary switch chamber 8 and has an actuating rod 16 for transmitting the thermal displacement of bimetallic elements 68, 68 which are connected to each other by a connecting plate 68' (FIG. 16) in the toasting compartment 6 to said auxiliary switch there-through and a movable contact plate 18 which is in contact with a glass ball insulator 17 provided at the tip end of said actuating rod 16. Upon thermal displacement of the bimetallic element, the actuating rod 16 exerts a force on the movable contact plate 18 through the glass ball 17 against the spring force of said contact plate, whereby the auxiliary switch 15 is opened. Auxiliary switch 15 is mounted on a support plate 20 pivotally mounted on an axle 20a near the base of the framework 1. In order to adjust the temperature at which the auxiliary switch 15 will open as a result of the aforementioned thermal displacement, an adjusting lever 19 is provided which is adapted to move transversely of the framework 1 in slot 19a (FIG. 3) which causes upstanding cam plate 19b to pivot intermediate plate 19c pivoted on axle 19d, thereby causing pin 19e to bear on plate 20 to rotate the switch support plate 20 to vary the relative position of the movable contact plate 18 relative to the actuating rod 16.

In the resistance wire chamber 7, a lever 21 is pivotally mounted in a pivot 22. One end of said lever 21 has extensible and contractible resistance wires 24 connected thereto through an insulator 23, so that the other end 25 of lever 21 is movable a distance which represents the amount of extension or contraction of said resistance wires 24. The two sets of resistance wires 24 are connected to each other by a connecting frame 26, the center of which is pivotally mounted on a pivot 27 on the base 2. The tension of the resistance wires 24 is adjusted by a screw 28 (FIG. 5).

Indicated generally at 29 is a main switch composed of fixed contact plates 31 and movable contact plates 32, which are mounted on a switch support plate 30 in juxtaposed relation with an insulator interposed therebetween. The switch support plate 30 is mounted on the end plate 3. The main switch 29 is normally held in the closed position due to the spring force of the movable contact plates 32. The terminals of the main switch are indicated at 33 and 34.

A retaining frame 35 is pivotally mounted on a pivot 39 on a fixed member 38 on end plate 3 for retaining a switch operating rod 37 (FIGS. 2 and 7-10. The retaining frame 35 has upwardly inclined notches 40 at the free end thereof for guiding the switch operating rod 37). The switch operating rod 37 has an insulator tube 36 on one end thereof and has a projection 41 at a point along the length thereof, said projection 41 being guided in a guide member 42 mounted on the retaining frame 35, the rod 37 being constantly biased inwardly into said guide notches 40 by a spring 43 connected between projection 41 and the end plate 3. The insulator tube 36 is opposed to the movable contact plates 32 of the main switch 29, and is urged by the contractive force of the spring 43 so as to press said movable contact plates 32 against the spring force of said plates so that the main switch 29 is opened. Upon extension of the spring 43, the main switch 29 is closed by the spring force of the movable contact plates 32.

A main lever 44 (FIG. 2) is pivotally mounted on a pin 45 on an extension of an auxiliary frame 3' mounted on the end plate 3 and has an L-shaped support member 46 at the end adjacent the inner casing 1 and the other end has an upwardly extending latch lever 47 pivotally mounted thereon. The upwardly extending latch lever 47 has a hook 49 on the inner edge thereof for engagement with an engaging member 48 which is a lateral extension of the lever 10, and on the outer edge of the upper portion it has an inclined surface 50. Below the inclined surface 50 is provided a hook 51 which has an angle of inclination smaller than that of the upwardly inclining notch 40 formed in the aforementioned retaining frame 35. The upwardly extending latch lever also has a lug 53 to which a main spring 52 for causing the return movement of the bread support is connected. The main spring 52 is provided for the purpose of accumulating therein the energy necessary for the upward movement of the bread support, and acts in such a manner as to cause the latch lever 47 to move downwardly with downward movement of the main lever 44. The downward movement of the latch lever 47 is limited by the abutment of a claw 55 at the inner end of the main lever 44 against a stop 54 formed in the side plate 3 (see FIG. 5). A connecting rod 56 has the upper end thereof connected to the movable end 25 of the lever 21 for the resistance wire and the lower end thereof is opposed to the support member 46 on the main lever 44. Connecting rod 56 pivotally connected at its mid-portion to the retaining frame 35. A spring 57 (FIGS. 1 and 5-8) has one end connected to the retaining frame 35 and the other end connected to a bracket on the base 2, so that the resistance wires 24 are tensioned by the contractive force of said spring through the connecting rod 56. The contractive force of spring 57 exerted as tension on the resistance wires 24 is stronger than the opposing force exerted by main spring 52 as exerted through latch lever 47, main lever 44 and connecting rod 56, but is smaller than the electric limit of said resistance wires 24.

A connecting rod 58 having both ends bent in an L-shape extends through slots 59 in the end plate 3 and a corresponding hole in the other end plate, and has one end in the auxiliary switch chamber 8 in abutting relation to a latch 60 (FIGS. 3 and 4) when the bread support 9 is in the bread removing position, and has the other end in the resistance wire chamber 7 opposed to the rear surface of the upper end portion of the latch lever 47. The latch 60 is connected with the movable bread support 9 and is pivotally mounted on an end of the crank lever 11 with said lever extending through a hole 61 formed therein (FIG. 4). A latch 62 is pivotally connected to the movable bread support 9. This latch has a semicircular shape to provide for movement of the upper lever 10 on which the fixed bread support 9' is mounted, and has a projection 63 at one end for abutment against the adjacent end plate 3, while the other end is provided with a hook 65 for engagement with a lug 64 on the latch 60. When the latch 60 is not in engagement with the connecting rod 58 due to its own weight.

Figure 16:
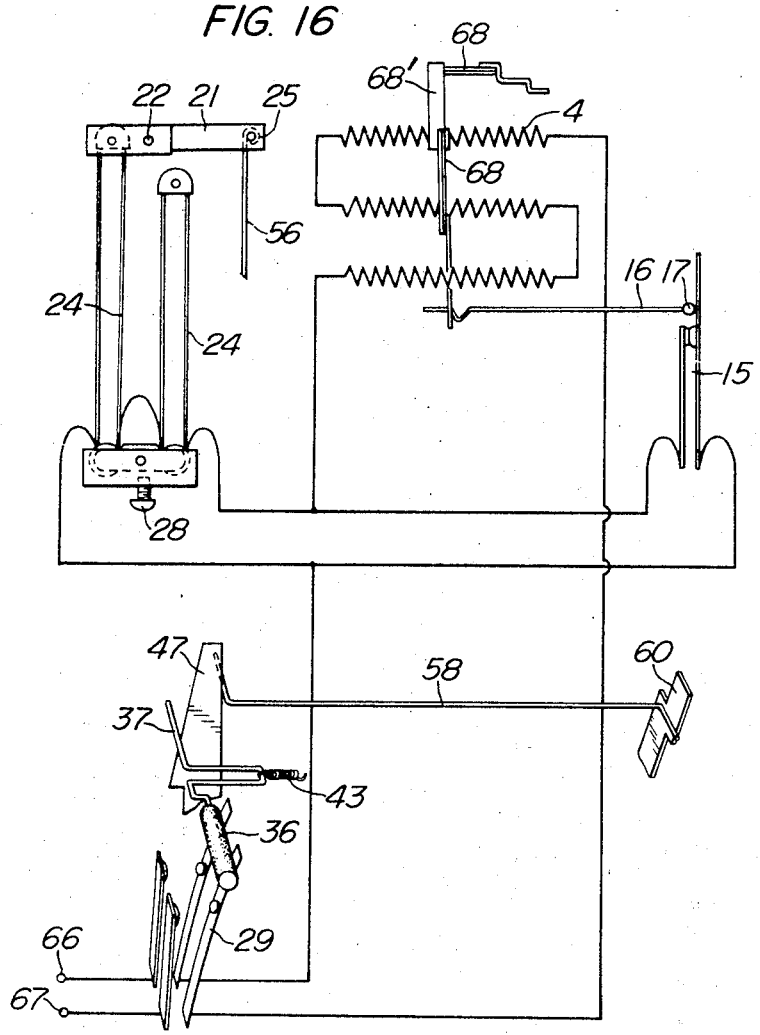
FIG. 16 is a schematic circuit diagram of the toaster of FIG. 1.

A schematic circuit diagram of this embodiment is shown in FIG. 16, in which it will be seen that a parallel circuit is formed of the auxiliary switch 15 and the resistance wires 24, and this parallel circuit and the bread toasting heater 4 are connected in series across the power source terminals 66, 67 through the main switch 29, said auxiliary switch 15 being operatively associated with the bimetallic members 68.

A description will now be given as to the manner in which the embodiment described above operates. When a slice of bread is placed on the bread support 9 when it is in the bread removing position shown in FIG. 5, the bread support 9 is pivotally moved against the bias of the spring 14 by the weight of the bread and this pivotal displacement of the bread support is transmitted to the latch 60 through the latch 62. The latch 60, therefore, pushes one end of the connecting rod 58, the other end of which in turn pushes the upper end of the latch lever 47. This causes a pivotal movement of said latch lever 47 about the pin by means of which it is connected to the main lever 44, in a direction away from the end plate 3. As a result, the hook 49 is disengaged from the engaging member 48 of the lever 10 and the levers 10, 11 are permitted to pivot about the respective fulcrums 13, thus bringing the bread supports 9 and 9' down into their toasting position shown in FIG. 6. The displacement of the latch lever 47 also causes the switch operating rod 37 to move outwardly, so that the insulator tube 36 at the end thereof is moved away from the movable contact plates 32 of the main switch 29 allowing the said main switch to move to the closed position, whereupon a current is conducted through the toasting heaters 4. The resistance wires 24, which are connected in parallel with the auxiliary switch 15, are not supplied with current because said auxiliary switch 15 is normally closed. The heat from the toasting heater 4 causes the bimetallic elements 68 to move and its displacement causes an outward movement of the actuating rod 16, which in turn pushes the movable contact plates 18 of the auxiliary switch 15, thus opening said switch. The current then flows through the resistance wires 24, with the result that the resistance wires elongate due to the heat generated therein.

Figure 9:
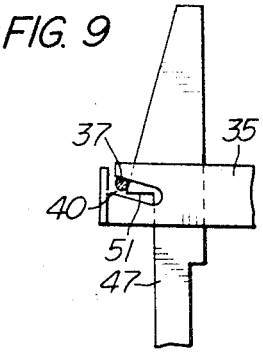
FIGS. 9 and 10 are side elevation views illustrating details of the engagement of the hooking portion of the latch lever shown in FIG. 1 with a switch operating rod.
Figure 10:
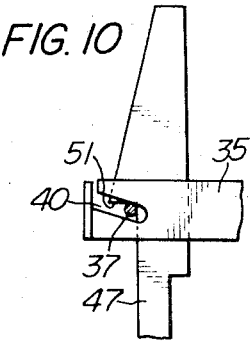
Figure 7:
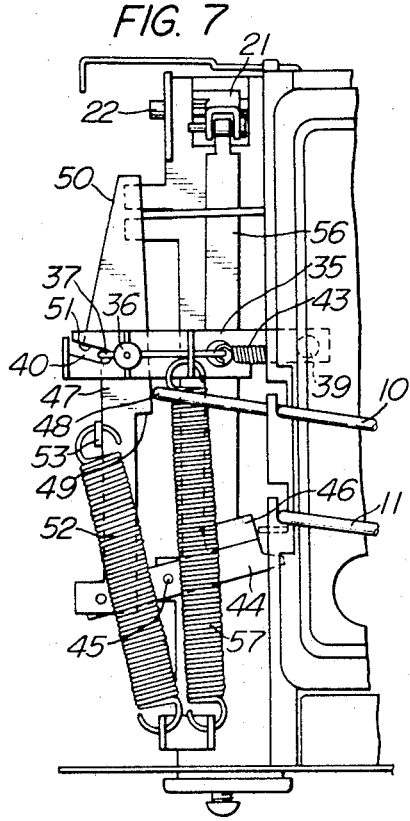

As the resistance wires 24 elongate, the connecting rod 56 is lowered by the lever 21, and its lower end depresses the support member 46 of the main lever 44, pivoting the main lever 44, whereby the latch lever 47 is moved upwardly by the other end of said main lever 44 against the bias of the main spring 52. Concurrently, the retaining frame 35 is pivoted downwardly around the pin 39 as the connecting rod 56 moves downwardly, so that the switch operating rod 37 is caused to move downwardly being guided along the inclined surface 50, as shown in FIG. 6, and finally being engaged under the hook 51 as shown in FIG. 7. The manner in which the switch operating rod 37 comes into engagement with the hook 51 is shown in FIGS. 9 and 10. Because the switch operating rod 37 is constantly urged towards the framework 1 by the spring 43, the switch operating rod 37 is moved toward the bottom end of the notches 40 in the retaining frame 35 when said notches come into register with the hook 51 on the latch lever 47 as a result of the relative displacement of said retaining frame 35 with respect to said latch lever 47, and the movement of the switch operating rod to the position of FIG. 7, causes the main switch 29 to open.

Figure 8:
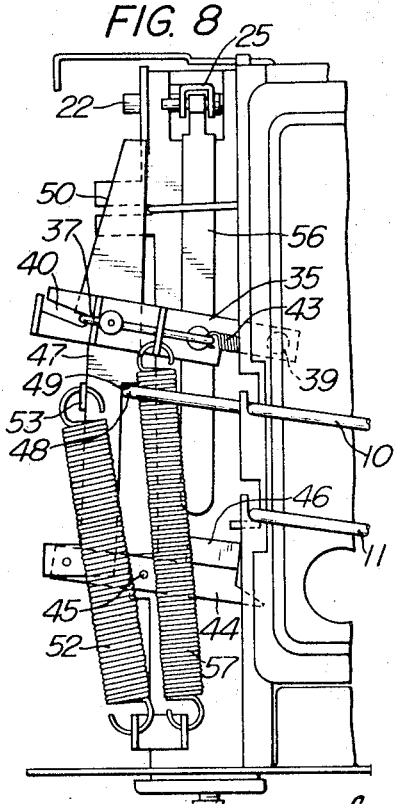

The opening of the main switch 29 interrupts the current flowing through the entire circuit and therefore the resistance wires 24 begin to contract, so that the connecting rod 56 is pulled upwardly causing the retaining frame 35 to pivot upwardly around the pin 39. Therefore, the latch lever 74 is also moved upwardly because the hook 51 is in engagement with the switch operating rod 37. This upward movement of the latch lever 47 takes place from the level to which it has previously been elevated upon extension of the resistance wires 24, against the bias of the main spring 52 and thereby energy is accumulated in said spring. The energy thus accumulated in the main spring 52 will subsequently serve as the motive power for the automatic return movement of the bread supports 9 and 9'. When the latch lever 47 has reached a predetermined elevated level as the contraction of the resistance wires 24 proceeds, the hook 49 engages over the engaging member 48 of lever 10, as shown in FIG. 8. The force causing this engagement is provided by a component of the force the main spring 52 to bias the latch lever 47 towards the framework 1. This will be apparent from FIG. 5 in which it will be seen that the main spring 52 is provided at a position closer to the framework 1 than the pin position in which the latch lever is pivotally mounted on the main lever 44 and is secured between the lever end of the auxiliary frame and the latch lever 47. In other words, the main spring 52 has a torque which it exerts on the latch lever 47 about said pin.

The displacement of the latch lever 47 upon engagement of the hook 49 with the engagement member 48 releases the hook 51 from engagement with the switch operating rod 37, thus moving the latch lever 47 into an unsupported position, so that the latch lever 47 is pulled downwardly by the spring force produced by the energy which has been accumulated in the main spring 52 and depresses the engaging member 48 which is in engagement with the hook 49, whereby the bread supports 9 and 9' are returned to the bread removing position as shown in FIG. 5. Thus one toasting cycle is completed.

Figure 14:
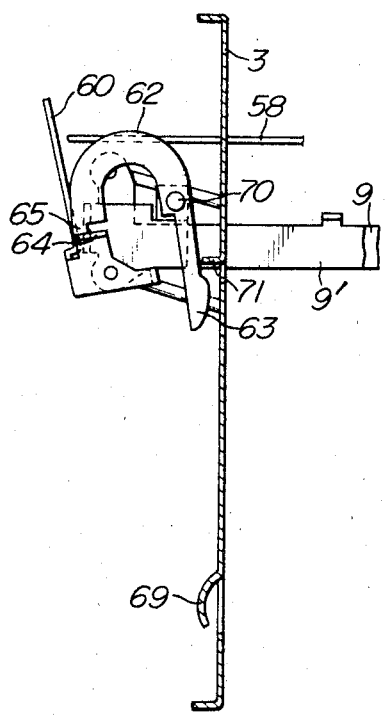
Figure 15:
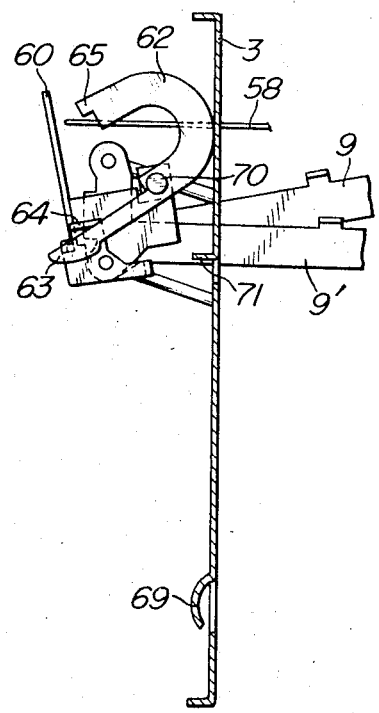

The operation of the latch 60 and the parts associated therewith, such as the latch 62, in the cycle of the toasting operation described above will now be explained. The hook 65 on the latch 62 is in engagement with the lug 64 of the latch 60 as shown in FIG. 11 when the bread support 9 is unloaded, but when the bread support 9 is loaded with a slice of bread, the bread support 9 pivots to a level position and the latch 60 presses against the connecting rod 58 as shown in FIG. 12. During the downward movement of the bread support 9, the latch 62 moves downward and remains in engagement with the latch 60 but the projection 63 formed at one end of the latch 62 abuts an outwardly projecting bent lug 69 cut out of the lower portion of the side plate 3 immediately before said latch 62 reaches its lowest position. The latch 62 is thereby rotated about a pin 70 by means of which it is connected to the bread support 9, so that the hook 65 is released from its engagement with the lug 64 of the latch 60, permitting said latch 60 to tilt outwardly away from wall 3 under the effect of gravity as shown in FIG. 13. When the bread support 9 has been returned to its original position upon completion of the toasting, the projection 63 on the latch 62 is released from engagement with the lug 69 and thus the latch 62 assumes its normal position. In this case, however, since the latch 60 has remained in the outwardly tilted position, the hook 65 is not engaged with the lug 64 and thus the latch 62 moves upwardly with the hook 65 being in contact with the upper surface of the lug 64 as shown in FIG. 14.

Upon removal of the toasted bread from the bread support 9, it moves to the upwardly inclined position under the action of spring 14 and the resultant outward displacement of the latch 62 enables the hook 65 to engage with the lug 64 again, preparatory to the next toasting cycle. In the neighborhood of the highest position of the bread support 9, there is provided another outwardly projecting lug 71 cut out of and bent out of the end plate 3 and engageable by the projection 63 of the latch 62. This lug 71 is provided to prevent re-toasting of the toasted bread which would otherwise occur if, during the return movement of the bread support 9 from the toasting position to the bread removing position, the toasted bread was caused to fly upwardly off the bread support 9 due to an excessively vigorous upward movement of said bread support for some reason, with the result that the bread support would be permitted to move to the inclined position momentarily, thus causing the hook 65 of the latch 62 to engage the lug 64 of the latch 60, and cause the latch 60 to be actuated by the bread dropping onto the bread support. The projection 63 on the latch 62, in the case of such an excessively vigorous upward movement of the bread support 9, abuts against the lug 71 to tilt the latch 62 around pivot 70 to raise the hook 65 and thereby the latch 62 is held out of engagement with the latch 60 in the condition shown in FIG. 15 during a momentary jumping of the bread off the bread support, so that engagement of the latch 60 with the latch 62 is avoided.

When it is desired to bring the bread support 9 into its original position during a toasting operation because of a malfunction or for some other reason, in the embodiment described, this can be attained, for example, by providing a manual operating lever 75 operatively connected with the crank lever 11, by means of which the crank lever 11, when it is in the position shown in FIG. 6, can be moved upwardly manually to bring the hook 49 of the latch lever 47 into engagement with the engaging member 48. The actuating point of the bimetallic members 68 can be adjusted so as to obtain a desired state of toasting by varying the position of the auxiliary switch 15 relative to the actuating rod 16 by means of the adjusting lever 19. According to the embodiment described, the current is required to be conducted through the resistance wires 24 only at substantially the end of the toasting operation and in addition, when the power circuit is cut off as a result of the elongation of the resistance wires 24, the bread support 9 is not elevated immediately but is retained in the toasting position during the period in which the resistance wires 24 are contracting. Therefore the heat remaining in the toasting heaters 4 can be fully utilized. This period of time also enables the bimetallic members 68 to recover after interruption of the current to the toasting heater 4, and therefore is useful for obtaining a better performance of the bimetal in sensing the state of toasting.

It should also be noted that, according to the foregoing embodiment, since the angle of inclination of the hook 51 is smaller than that of the guide notch 40, the switch operating rod 37 drops into the notch 40 instantaneously, which is advantageous in obtaining a positive operation of the toasting cycle, in protecting the contacts of the main switch 29 and in preventing an undesirable noise.

A further embodiment of the present invention is shown in FIGS. 17 to 25.

The base 2, end walls 3, sides 5, bread supports 9 and 9′, leavers 10 and 11, bimetallic element 68, actuating rod 16, auxiliary switch 15, toasting heater 4, and associated parts are the same as in the embodiment of FIGS. 1–16. The latch 60 is similar, but no latch 62 and associated parts have been provided.

A main lever 101 is pivotally mounted at one end 3 of the framework 1 about one of the fulcrums 13 for the levers 10 and 11 and its downward movement is restricted by a stop 102 (FIG. 23), said main lever being constantly urged in a downward direction by a spring 103. The extensible and contractible resistance wire 24 has its free end connected to a movable element 21 which is pivoted on a pivot 22 in a similar manner in the embodiment of FIGS. 1–16, but in a slightly different location, and with the support 23 for the resistance wire between the pivot 22 and the free end of lever 21, and a connecting element 104 is connected to one end of said movable element 21. The connecting element 104 has a slot 105 formed therein in which is engaged a projection 106 provided on the main lever 101. A transverse lever 107 has one end pivoted to the connecting element 104 and has a resilient member 110 on the other end thereof which is connected thereto by way of a spring member 109, said transverse lever being mounted at its mid portion on a pivot 108 on a plate 108a projecting from end wall 3. A spring 111 is mounted between the transverse lever 107 and an ear 111a on the end wall 3 so that the extensible and contractible wire is constantly kept under tension by said spring through the connecting element 104 and the movable element 21. A latch lever 112 is pivotally mounted on the main lever 101 on a pivot 113. A downwardly extending arm 114 is provided on the latch lever 112 and has a guide surface 118 thereon engageable with an engaging member 115 on the lever 11. An upwardly extending arm 117 is also provided on the latch lever 112 and has a guide surface 118 thereon engageable with the resilient member 110 on the end of transverse lever 107 so that the resilient member 110 can slide thereon. A hook 119 is provided on arm 117 beneath guide surface 118. The end of connecting rod 58 engages the upper end of arm 117. The latch lever 112 is constantly urged towards the side wall of the framework by a spring 120 connected between it and lever 101, so that the cutout 116 in the downwardly extending arm 114 and the engaging member 115 of the lever 10 are normally held in engagement. Also pivotally mounted on the pivot 113 for the latch lever 112 is a switch operating lever 121 which has a downwardly extending arm 124 which is opposed to the movable contact 123 of a power switch 122 and an upwardly extending arm 125 in juxtaposed relation to and extending beyond the hook 119 of the upwardly extending arm 117 on the latch lever 112. A stop 126 is provided on the top end of the upwardly extending arm 125 and engages with the rear edge of the upwardly extending arm 117, so that the forward movement of the upwardly extending arm 125 is restrained when said stop 126 engages with the rear edge of the upwardly extending arm 117. At this position the front surface of the upwardly extending arm 125 is aligned with the guide surface 118 on said arm 117. The power switch 122 is a normally closed type, and is opened only when it is abutted by the arm 124 on said switch operating lever 121. A saddle 127 carries a pivoted lever 26 on which the lower ends of extensible and contractible wires 24 are mounted, and adjustment of the degree to which said wire is stretched or contracted can be effected by raising and lowering of lever 26 by means of a screw 128.

The schematic circuit diagram for the toaster described above is shown in FIG. 25, in which it will be noted that the heater 4 for toasting bread and a parallel circuit comprising the extensible and contractible wire 24 and the normally closed switch 15 are connected in series across the power terminals 66 and 67 through the power switch 122, said normally closed switch 15 being positioned so as to be actuated by the bimetallic members 68.

Figure 17:
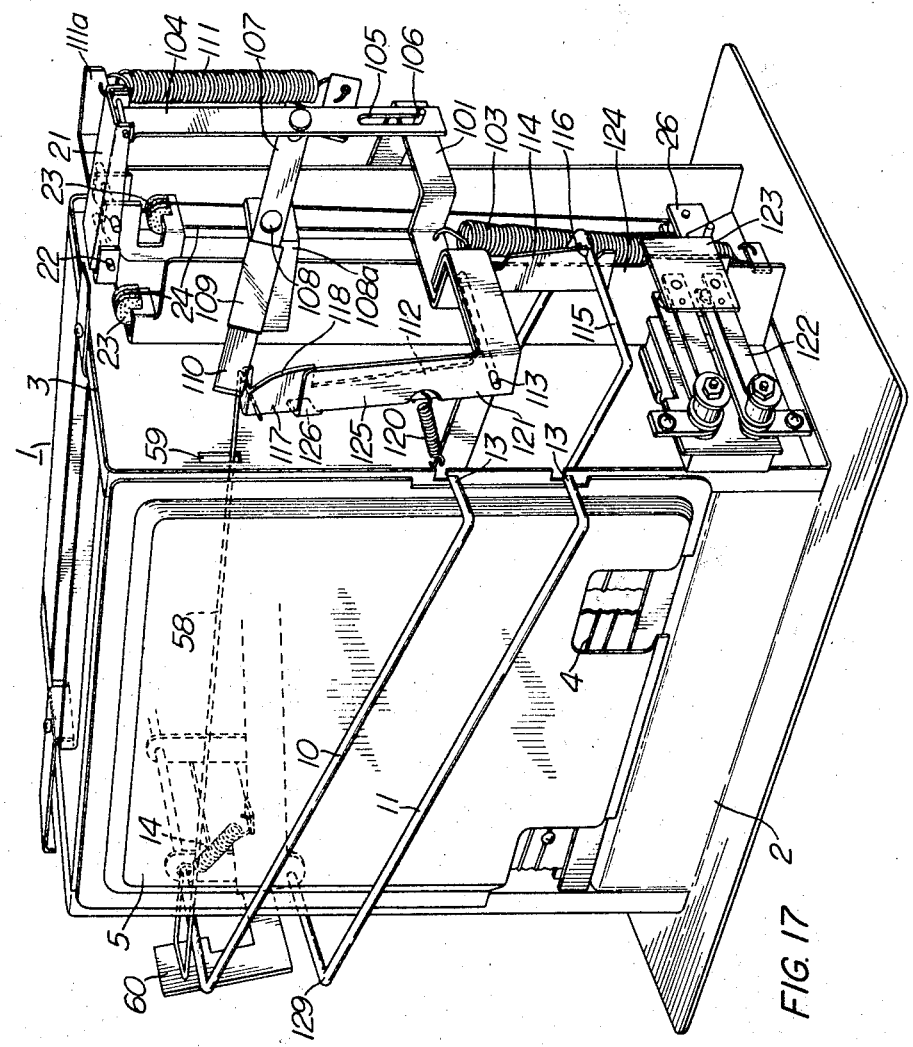
FIG. 17 is a perspective view of another embodiment of the toaster of the invention as viewed from one end thereof and with the outer casing removed.
Figure 18:
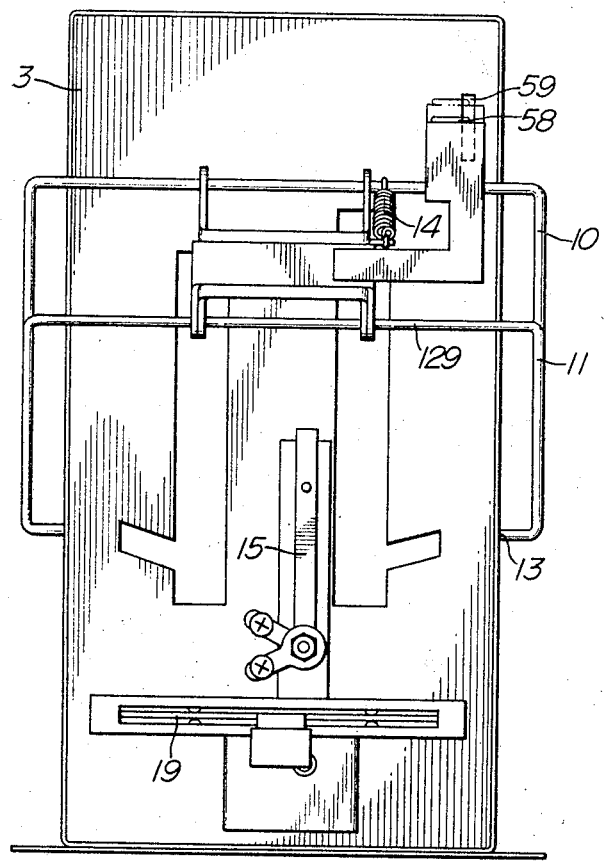
FIG. 18 is an end elevation of the toaster shown in FIG. 17 and as viewed from the other end thereof.
Figure 19:
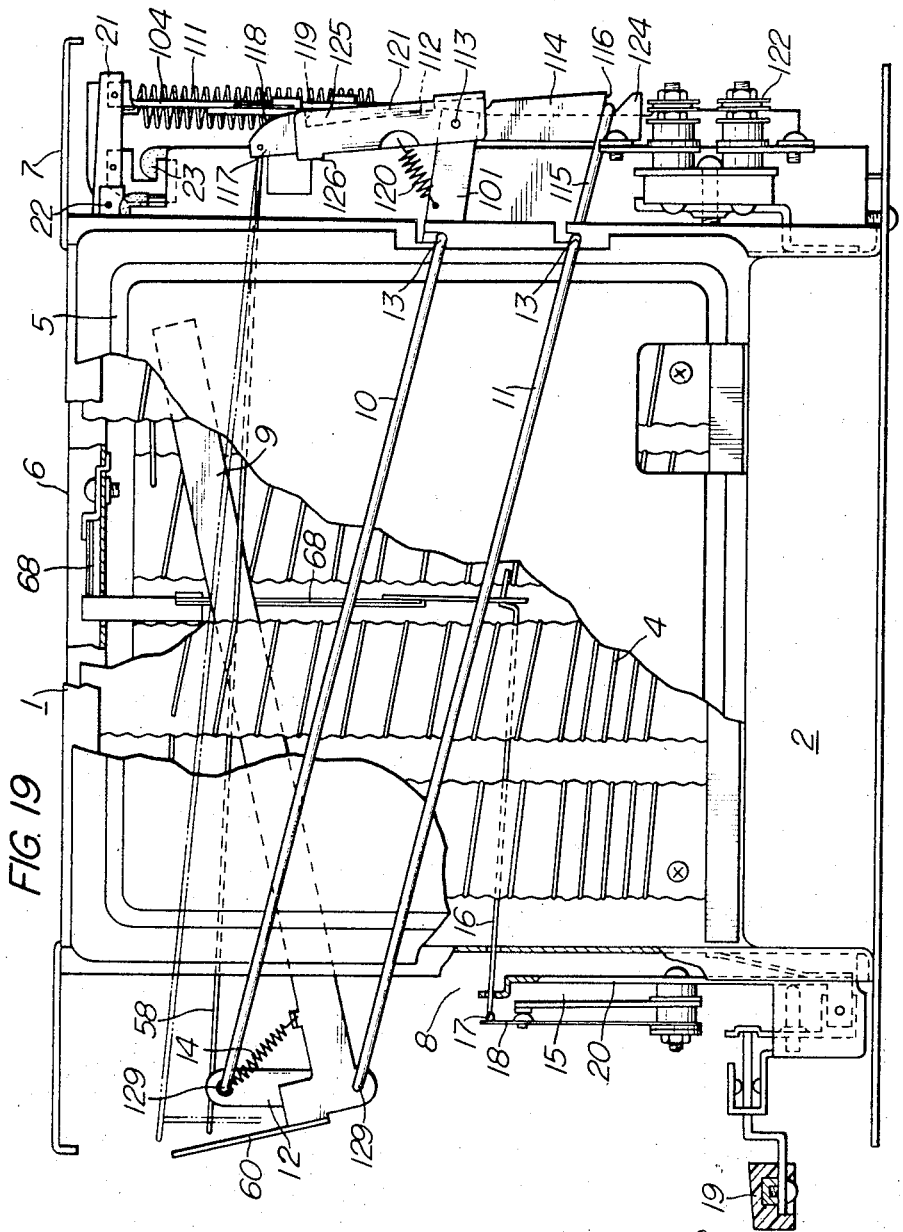
FIG. 19 is a side elevation, partially broken away, of the toaster shown in FIG. 17.
Figure 20:
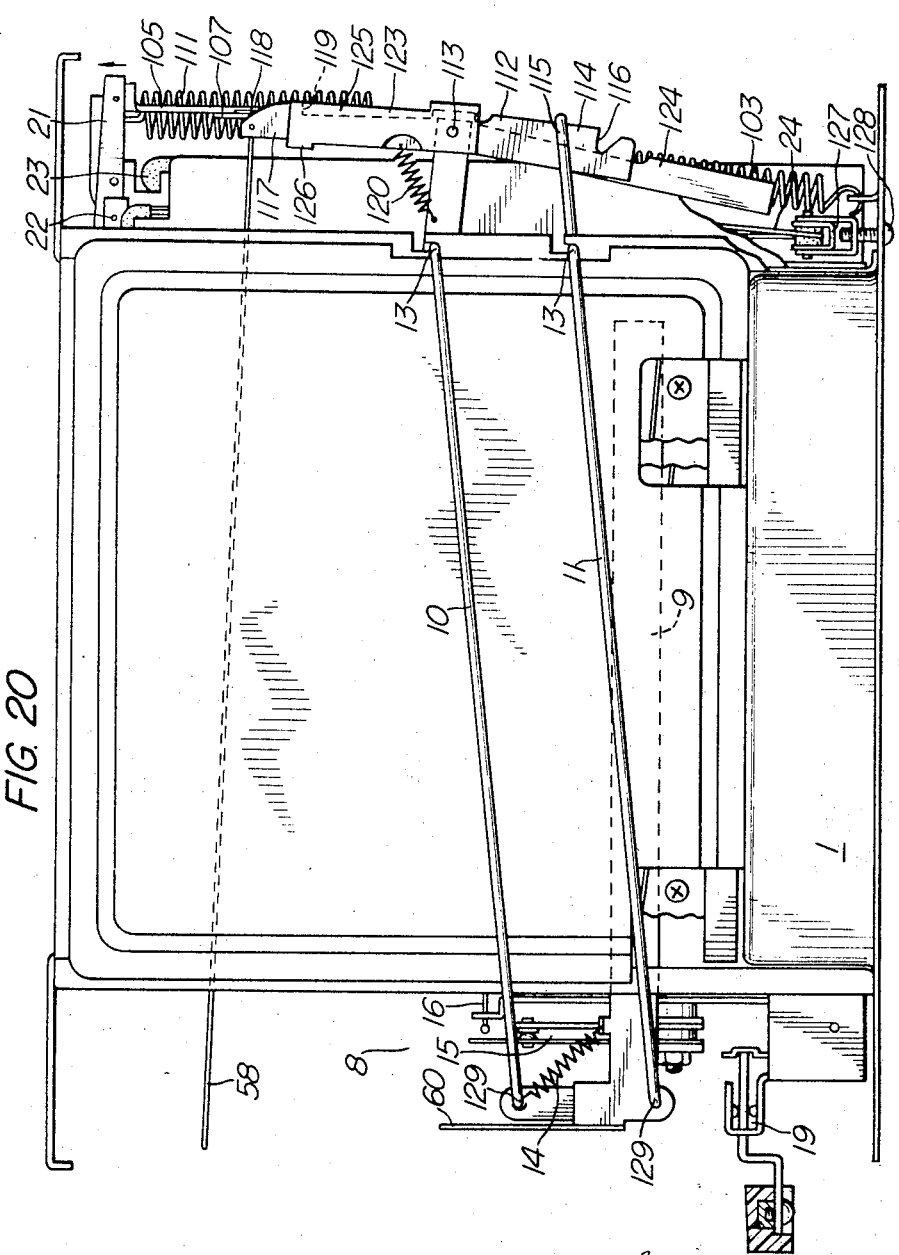
FIG. 20 is a side elevation similar to FIG. 19, with the parts in the toasting position.
Figure 21:
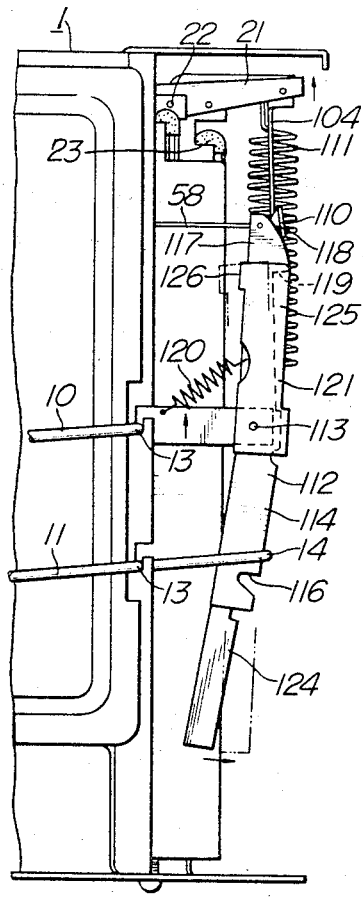
FIGS. 21 and 22 are fragmentary side elevation views of the toaster shown in FIG. 17, showing the parts in the positions occupied in successive steps of the operation thereof.
Figure 22:
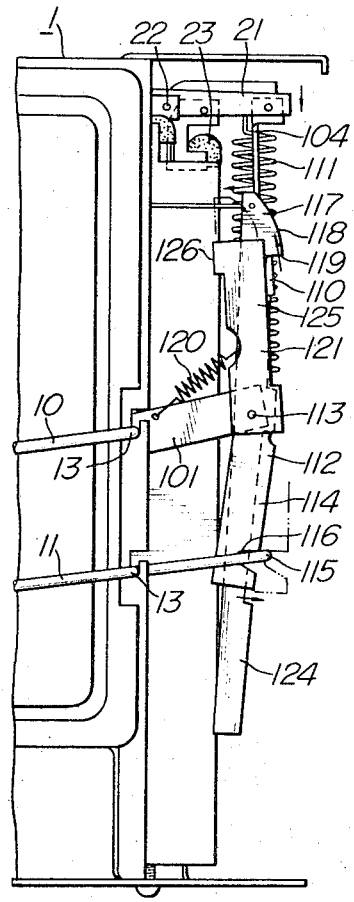
Figure 23:
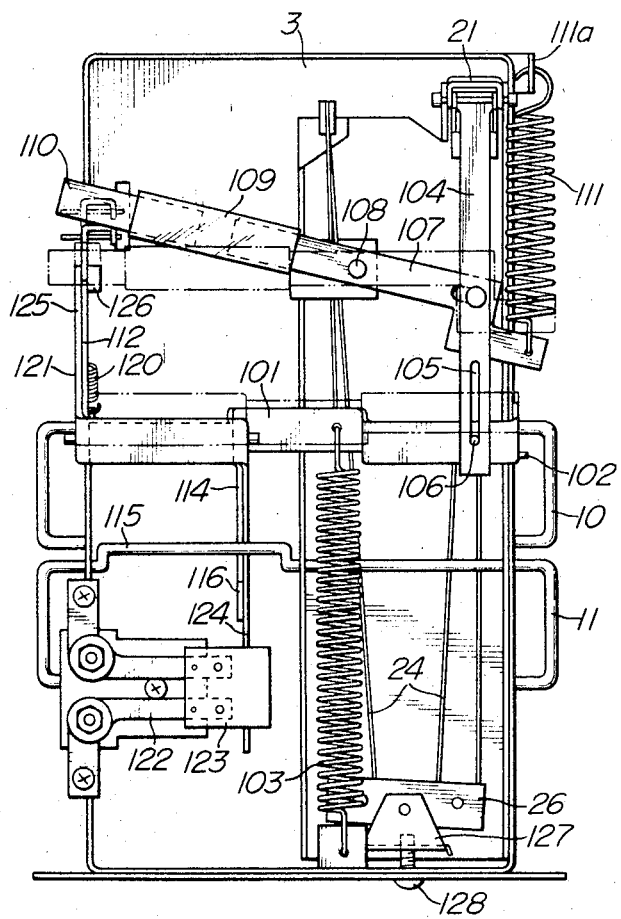
FIGS. 23 and 24 are end elevations of the toaster shown in FIG. 17 showing the parts in the positions occupied in successive steps in the operation thereof.
Figure 24:
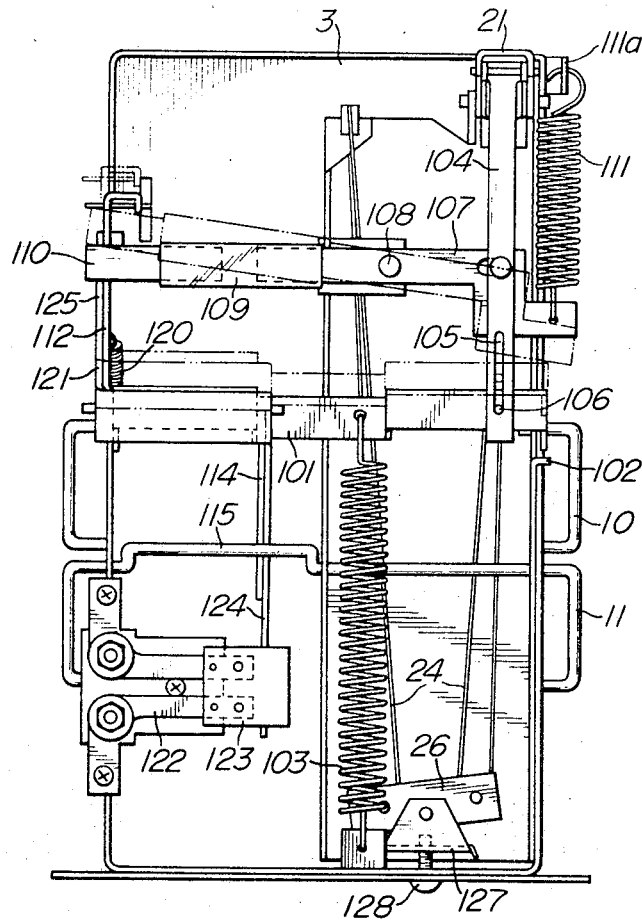

The toaster described operates in the manner described below. Referring specifically to FIGS. 17, 18 and 19, a slice of bread is first mounted on the bread support 9 which is in the upwardly inclined bread removing position as shown. The bread support 9 is lowered under the weight of the bread, causing the latch 60 to turn around the laterally extending supporting rod 129 on the crank lever 11 to press against the connecting rod 58. The movement of the connecting rod 58 causes the latch lever 112 connected thereto to swing away from end wall 3 against the bias of the spring 120 so that the cutout 116 in the downwardly extending arm 114 is released from the engagement with the engaging member 115 on the lever 11. Thus, the levers 10 and 11 are lowered by the weight of the bread to the toasting position. At the same time, the downwardly extending arm 124 of the switch operating lever 121, which has been pressing the movable contact 123 of the power switch 122 outwardly, with the stop 126 in engagement with the latch lever 112, is moved toward the end wall 3 due to the resilient force of said movable contact 123, because the upwardly extending arm 117 on said latch lever 112 swings away from the stop 126 thus freeing switch operating lever 121, and thus the power switch 122 is closed so as to permit a current to flow through the toasting heater 4. When the bread has been toasted to a desired degree, the bimetallic element is actuated and the deflection of the bimetallic elements causes the normally closed switch 15 to open by means of the movement of the operating rod 16, and causing a current to flow through the extensible and contractible wire 24. At this time, the heater 4 and the extensible and contractible wire 24 are connected in series. The extensible and contractible wire 24 is stretched and the amount by which it is stretched is governed by the force of the spring 103, with the result that the free end of the movable element 21 is raised as shown in FIGS. 20 and 21. Consequently, the connecting element 104 is moved upwardly causing the transverse lever 107 to pivot about the pivot 108 in the direction shown in FIG. 23 from the position indicated by the solid lines to the position indicated by the dotted lines, so that the resilient member 110, provided at the free end of said lever 107 slides downwardly on the guide surface 118 of the upwardly extending arm 117 and finally engages under the hook 119. During this period, the main lever 101 is pulled upwardly by the connecting element 104 as the latter moves upwardly, stretching the spring 103 further. The increased tension force is subsequently to be used as the motive power for automatically raising the bread support 9 to its original position. When the resilient element 110 engages the latch lever 112, the upwardly extending arm 125 and the switch operating lever 121 are pushed toward the end wall 3 by the resilient element 110. Therefore, the movable contact 123 of the power switch 122 is pushed away from the end wall 3 by the downwardly extending arm 124 of said switch operating lever and thus the power switch 122 is opened, interrupting the current flowing through the toasting heater 4 and the extensible and contractible wire 24. The extensible and contractible wire 24 starts to contract and this force of contraction is transmitted to the connecting element 104 through the movable element 21 in the direction shown by the arrow in FIG. 22. The connecting element 104 is, therefore, permitted to move downward. The transverse lever 107 turns clockwise about the pivot causing the resilient member 110 to move upward while it is still in engagement with the hook 116 on the latch lever 112, and this causes the latch lever 112 and accordingly the main lever 101 to move upward further so that the spring 103 is stretched still further. It will be understood that the movements of the connecting element 104 and the main lever 101 in opposite directions are possible because the projection 106 on the latter is movable in the slot 105 formed in the former. When the main lever 101 has reached a predetermined level, the cutout 116 in the downwardly extending arm 114 of the latch lever 112 moves into engagement with the engaging frame 115 of the crank lever 11, as shown in FIG. 22. The force required for such engagement is supplied by the spring 120. At the same time the downwardly extending arm 114 on the latch 112 moves away from end wall 3 due to the engagement with frame 115 and the consequent relative movements of the upwardly extending arm 125 and the arm 117 of the latch lever 112 release the engagement of the resilient element 110 on the transverse lever 107 with the hook 119 on the latch lever 112. The main lever 101 is now free of any restraint and is returned to its original position by the force produced by the energy which has previously been accumulated in the spring 103. This force for returning said main lever to its original position is transmitted to the crank lever 11 through the latch lever 112, as a result of which the bread support 9 is moved upwardly to the bread removing position. At this time, the latch 60 carried on the bread support 9 moves upwardly as indicated by the dotted lines in FIG. 19 and pushes the end extremity of the connecting rod 58 upwardly as indicated by the dotted lines in said figure. Upon removal of the bread, the latch 60 and the end extremity of the connecting rod 58 return to their orginial positions, indicated by the solid lines, so that a fresh slice of bread can then be placed on bread support 9. For convenience, the end extremity of the connecting rod 58 can be formed with, e.g. a separate wire, so that only that portion swings as shown in the figure.

FIGS. 26 and 27 show another embodiment of a mechanism for the prevention of erroneous operation of the latch in which a holding member 202 having a laterally bent end 201 is mounted on the upper portion of the end plate 3a, and the bread support 9a is provided with an upwardly extending member 203 engageable with said holding member 202, so that even if the bread support 9a starts to make a vigorous upward movement, the upwardly extending member 203 engages the holding member 202 and thereby is prevented from tilting. With this arrangement therefore, there is no possibility that the hook 65a on the latch 62a will engage the lug 64a on the latch 60a. Since the holding member 202 is only required to engage the upwardly extending member 203 when the bread support 9a is at the highest possible position which it takes temporarily, the holding member 202 is located in a position in which it is not engageable with the upwardly extending member 203 when the bread support 9a is in the normally elevated position and, therefore, the holding member 202 does not interfere with the normal operation of the toaster.

Adjustment of the actuating point of the bimetallic elements 68 for obtaining bread toasted to a desired condition can be accomplished in the same manner as mentioned in the above embodiment.

It should be noted that although in the embodiments described herein a spring is used as a source of energy for raising the bread support, the source of energy is not restricted only to a spring but includes a mechanism using, for example, a gas. The means for raising the bread support is designed such that the energy is released so as not to eject the bread from the toaster. A more smooth elevation of the bread support can be obtained, for example, by the use of a damper.

It will be appreciated from the foregoing description that the present invention, in which the bread support is shifted from the bread-removing position to the toasting position by the weight of the bread and from the toasting position to the bread-removing position by the release of the energy which has been accumulated, is advantageous in that the bread support can be shifted vertically and quickly, that the power consumption can be minimized since current is fed to the extensible and contractible wire only at substantially the end of the toasting process, that there is no power wasted since the amounts of movement of the extensible and contractible wire as a result of both stretching and contraction are accumulated as energy for returning the bread support to its original position, and that it is possible to provide a toaster which is simple in construction and low in cost as compared to conventional toasters employing an electromagnet or a motor, and which operates very smoothly without generating an undesirable sound.

It is believed that the construction and merits of the present invention will be clearly understood by those skilled in the art from the foregoing description. It is to be noted that although the foregoing description is directed to particular embodiments of the invention, the present invention is not restricted thereto, but many modifications and changes in the detailed parts of the construction are possible without deviating from the spirit and scope of the invention as defined in the attached claims.

What is claimed is:

1. An automatic toaster having a bread toasting compartment, toaster heating elements in said compartment, a power circuit coupled to said toaster heating elements, a bread support means having a bread support member, said bread support means being movable to move said bread support member from a bread removing position adjacent the upper portion of said toasting compartment to a bread toasting position adjacent the lower portion of said compartment, holding means engageable with said bread support means for holding said bread support means with the bread support at the bread removing position and disengageable from said bread support means when a slice of bread is placed on said bread support, power circuit switching means coupled to said holding means for closing said power circuit when said holding means is disengaged from said bread support means, an expansible and contractible resistance wire, an energy accumulating means coupled to said wire for accumulating energy as said wire stretches when a current is passed therethrough and for accumulating energy when said wire contracts as it cools after the current is cut off from said wire, lifting means for lifting said bread support means to move the bread support member to the bread removing position, said energy accumulating means coupled to said lifting means for actuating said lifting means after a predetermined amount of energy has been accumulated, and control means for said power circuit for supplying current to said resistance wire after a predetermined toasting condition has been reached and thereafter opening said power circuit switching means after said resistance wire has expanded a predetermined amount.

2. An automatic toaster having a bread toasting compartment, toaster heating elements in said compartment, a power supply circuit coupled to said toaster heating elements, a bread support means having a bread support member, said bread support means being movable to move said bread support member from a bread removing position adjacent to the upper portion of said toasting compartment to a bread toasting position adjacent the lower portion of said compartment, said bread support means having an engagement member thereon, a latch lever movable into and out of engagement member and holding said engagement member with the bread support in the raised position, switch means in said power supply circuit, a switch operating member coupled to said latch lever for closing said switch means when said latch lever is initially moved to the disengaged position, a main lever pivotally mounted on said toaster and on which said latch lever is pivotally mounted, an energy accumulating means coupled to said main lever and biasing said main lever in a direction to cause said latch lever to hold said bread support means in a position with said bread support in the bread removing position, an expansible and contractible resistance wire on said toaster, said wire being coupled to said main lever for pivoting said main lever in a direction to increase the bias force on said main lever both when said wire expands when a current flows therethrough and when said wire contracts as it cools when the current flow has been cut off, control means in said power supply circuit responsive to the temperature in said toaster compartment for switching current to said resistance wire when the temperature in said toasting compartment reaches a predetermined value, said latch lever being movable during said pivoting of said main lever in the same direction as said engagement member is moved as said bread support moves to the bread toasting position, said switch operating member being engaged by said latch member during the movement under the effect of expansion of said resistance wire for opening said switch means to cut off the power to said toaster heating elements and to said resistance wire, means coupled to said latch lever for engaging it with said engaging member after further movement under the effect of the contracting of said resistance wire and disengaging it from the coupling to said resistance wire, whereby the bias force of the energy accumulating means acts on said engaging member to move the bread support means to return said bread support to the bread removing position.

3. An automatic toaster as claimed in claim 2 in which tenson means are coupled to said resistance wire for expanding the wire when current flows through it.

4. An automatic toaster as claimed in claim 2 in which the coupling between said resistance wire and said main lever comprises a lost motion type of coupling between the resistance wire and said main lever for transmitting motion only during stretching of said wire, and further disengageable coupling means coupled between the resistance wire and said latch lever for transmitting motion during contraction of the wire, said lost motion coupling permitting relative movement between the resistance wire and the main lever during contraction of the wire.

5. An automatic toaster as claimed in claim 4 in which said main lever is pivoted to said toaster intermediate the coupling of said resistance wire thereto and the pivoting point of said latch lever, said resistance wire having a connecting member coupled thereto in abutting engagement with said main lever, said latch lever having a notch in one edge thereof engageable over said engagement member and a notch in the other edge in which said switch operating member is receivable, and said means for engaging said latch lever with said engagement member comprises spring means connected to said latch lever for swinging said latch lever toward said engagement member.

6. An automatic toaster as claimed in claim 5 in which said further disengageable coupling means comprises a retaining frame having one end pivotally mounted on said toaster and having the connecting member of the resistance wire pivoted intermediate the ends thereof, the free ends of said retaining frame having a notch therein in which said switch operating member is engageable.

7. An automatic toaster as claimed in claim 4 in which said main lever is pivoted to said toaster at one end thereof and said resistance wire and latch lever are at the other end of the main lever, said resistance wire having a connecting member coupled thereto with a slot in the free end thereof and a projection on said main lever engaged in said slot to form the lost motion coupling, said latch lever having a downwardly extending arm with a notch therein engageable over said engagement members, and said switch operating member being pivoted on said main lever and engageable with said latch lever for movement to open and close said switch means, and said means for engaging said latch lever with said engagement member comprises spring means connected to said latch lever for swinging said latch lever toward said engagement member.

8. An automatic toaster as claimed in claim 7 in which said further disengageable coupling means comprises a transverse lever pivoted on said toaster and having one end pivotally connected to said connecting member for said resistance wire, said latch lever having an upwardly extending arm with a hook thereon under which the free end of said transverse lever is engageable, the free end of said transverse lever being resiliently biased toward said upwardly extending arm.

9. An automatic toaster as claimed in claim 2 and further comprising means for preventing recycling of the toaster when a piece of toast rises off said bread support member as a result of an excessively fast rise of said bread support means, said means comprising a pivotal mounting on said bread support means on which said bread support member is pivotally mounted, a locking latch on said bread support member, a latch pivotally mounted on said bread support means and pivotable away from said bread support means under the effect of its own weight or under the biasing state by a spring, said latch having a lug thereon engaged by said locking latch for holding said latch coupled to said bread support member and pivoting said latch toward said bread support means when said bread support member is pivoted when a slice of bread is placed thereon, a connecting rod with which said latch is engageable and extending from a point adjacent said latch to a position against said latch lever for pivoting said latch lever when it is moved, by said latch, a first projection on the end of said toaster adjacent the lowermost position of said bread support means and engageable by said locking latch for pivoting said locking latch out of engagement with said lug when the bread support means reaches the lowermost position, and a further projection on the end of said toaster adjacent the position of said locking latch on said bread support means when said bread support means has moved past its normal uppermost position due to an excessively fast rise of the bread support means and engageable by said locking latch for pivoting said locking latch out of engagement with said lug, whereby when the bread support means moves past the normal uppermost position and a slice of bread rises off the bread support and the bread support member tends to pivot so as to move the locking latch toward said latch for engaging the locking latch with said lug, the locking latch will be raised to avoid engagement of the locking latch with said lug.

References Cited

UNITED STATES PATENTS

| | | | |
|---|---|---|---|
| 2,616,358 | 11/1952 | Stevenson et al. | 99—329 |
| 2,655,860 | 10/1953 | Smith | 99—329 |
| 2,667,828 | 2/1954 | Koci | 99—329 |
| 2,844,089 | 7/1958 | Lynch | 99—329 |
| 2,920,550 | 1/1960 | Schmall et al. | 99—329 |
| 3,196,775 | 7/1965 | Altemiller | 99—329 |
| 3,350,997 | 11/1967 | Kimura et al. | 99—329 |

BILLY J. WILHITE, *Primary Examiner.*